(12) United States Patent
Dorneich et al.

(10) Patent No.: US 8,200,454 B2
(45) Date of Patent: Jun. 12, 2012

(54) METHOD, DATA PROCESSING PROGRAM AND COMPUTER PROGRAM PRODUCT FOR TIME SERIES ANALYSIS

(75) Inventors: Ansgar Dorneich, Holzgerlingen (DE); Maik Goergens, Jena (DE); Andrzej Toroj, Warsaw (PL)

(73) Assignee: International Business Machines Corporation, Armonk, NY (US)

(*) Notice: Subject to any disclaimer, the term of this patent is extended or adjusted under 35 U.S.C. 154(b) by 661 days.

(21) Appl. No.: 12/119,900

(22) Filed: May 13, 2008

(65) Prior Publication Data

US 2009/0018798 A1 Jan. 15, 2009

(30) Foreign Application Priority Data

Jul. 9, 2007 (EP) .................... 07112036

(51) Int. Cl.
*G01R 23/16* (2006.01)
(52) U.S. Cl. ........... 702/179; 702/76; 702/79; 702/182; 705/7.29; 705/7.31
(58) Field of Classification Search .......... 702/179, 702/187, 196
See application file for complete search history.

(56) References Cited

U.S. PATENT DOCUMENTS

| | | | | |
|---|---|---|---|---|
| 6,400,998 B1* | 6/2002 | Yamazaki et al. | ............. | 700/86 |
| 6,611,726 B1* | 8/2003 | Crosswhite | .................... | 700/99 |
| 6,914,963 B2 | 7/2005 | Peoples | | |
| 7,848,946 B2* | 12/2010 | Acharya et al. | ............. | 705/7.31 |
| 8,010,324 B1* | 8/2011 | Crowe et al. | .................... | 703/2 |
| 2003/0200134 A1* | 10/2003 | Leonard et al. | ................ | 705/10 |
| 2004/0122950 A1* | 6/2004 | Morgan et al. | ............... | 709/226 |
| 2005/0137830 A1* | 6/2005 | Moessner et al. | ............ | 702/176 |
| 2007/0179753 A1* | 8/2007 | Barajas et al. | ............... | 702/189 |

OTHER PUBLICATIONS

NIST SEMATECH, Engineering Statistics Handbook, no date, 6.4.4.3. Seasonality, http://www.itl.nist.gov/div898/handbook/pmc/section4/pmc443.htm.*
LaViola, Jr., J., "Double Exponential Smoothing: An Alternative to Kalman Filter-Based Predictive Tracking", 2003, The Eurographics Association, Internationla Immersive Projection Technologies Workshop, pp. 1-8.*
Gelper, S., Fried, R. & Croux, C., "Robust forecasting with exponential and Holt-Winters smoothing", Apr. 30, 2007, Department of Decision Sciences and Information Management (KBI), KBI 0718, pp. 1-22.*
Office Action for U.S. Appl. No. 12/119,997 dated Apr. 30, 2010.
Gardner, E. S., Jr.; "Exponential Smoothing: The State of the Art—Part II," Jun. 3, 2005; Retrieved Mar. 31, 2008 from www.bauer.uh.edu/gardner/Exponential%20Smoothing.pdf.
Tashman, L.J., Kruk J.M.; "The Use of Protocols to Select Exponential Smoothing Procedures: A Reconsideration of Forecasting Competitions," International Journal of Forecasting, No. 12, pp. 235-253, 1996.

(Continued)

*Primary Examiner* — Drew A Dunn
*Assistant Examiner* — Mischita Henson
(74) *Attorney, Agent, or Firm* — Mollborn Patents, Inc.; Fredrik Mollborn

(57) ABSTRACT

Method, apparatus, and system, including computer program products, implementing and using techniques for time series analysis, wherein the time series exhibit trend and/or seasonality. Model parameters of the time series data are determined by selecting and/or suggesting a most appropriate combination of trend and seasonality of the time series data based on analysis of variances of transformed time series data.

14 Claims, 11 Drawing Sheets

OTHER PUBLICATIONS

Taylor, J.W.; "Exponential Smoothing With a Damped Multiplicative Trend," International Journal of Forecasting, No. 19, pp. 715-725, 2003.

Shah, C.; "Model Selection in Univariate Time Series Forecasting Using Discriminant Analysis," International Journal of Forecasting, No. 13, pp. 489-500, 1997.

Meade, N.; "Evidence for the Selection of Forecasting Methods," Journal of Forecasting, No. 19, pp. 515-535, 2000.

Hyndman, R.J., Wheelwright S.C., Makridakis S., Forecasting: Methods and Applications, 3rd ed., 1998, John Wiley & Sons, New York, pp. 147-178.

Duhamel, P. and M. Vetterli, Fast Fourier Transforms: A Tutorial Review and a State of the Art, Signal Processing 19 (1990), 259-299, Elsevier.

Gardner, E.S. Jr., McKenzie, Ed. "Model identification in exponential smoothing." Journal of the Operational Research Society, 1988, No. 39, pp. 863-867.

Office Action for U.S. Appl. No. 12/119,997 dated Sep. 17, 2010.

Office Action for U.S. Appl. No. 12/119,997 dated Jan. 21, 2011.

Notice of Allowance for U.S. Appl. No. 12/119,997 dated Jul. 15, 2011.

* cited by examiner

| Differentiating Normal | Seasonal 0 | 1 | 2 |
|---|---|---|---|
| 0 | V(0,0) | V(0,1) | V(0,2) |
| 1 | V(1,0) | V(1,1) | V(1,2) |
| 2 | V(2,0) | V(2,1) | V(2,2) |

Fig. 10

| Label | Analyzed sequence | V1, V2, V3 | Normal differentiating | Seasonal differentiating |
|---|---|---|---|---|
| A | Column 1 | V(0,0), V(1,0), V(2,0) | growing | 0 |
| B | Column 2 | V(1,1) V(2,1) | growing | 1 |
| C | Diagonal | V(0,0), V(1,1), V(2,2) | growing | growing |
| D | Under diagonal | V(1,0), V(2,1) | growing | growing |
| E | Row 3 | V(2,0), V(2,1), V(2,2) | 2 | growing |
| F | Row 2 | V(1,0), V(1,1) | 1 | growing |

Fig. 11

| Condition | Label |
|---|---|
| $V_1 > V_2 (> V_3)$ | Falling (↘) |
| $V_1 < V_2 (< V_3)$ | growing (↗) |
| $V_1 > V_2 < V_3$ | minimum (→) |

Fig. 12

| Selection | D ↗ | | D ↘ | | | | | |
|---|---|---|---|---|---|---|---|---|
| | A ↗ | A → ↘ | B ↗ | | B ↘ | | | |
| | | | A ↗ | A → | A → ↗ or E ↘ → or F ↘ | | | A ↘ and E ↗ and F ↗ |
| | | | | | | | | |
| | | | | C ↘ or E ↘ | C → ↗ and E → ↗ | E ↘ | E → ↗ | |
| Trend | N | A | N | A | A | M | M | M |
| Seasonality | N | N | A | M | A | M | A | N |

Fig. 13

METHOD, DATA PROCESSING PROGRAM AND COMPUTER PROGRAM PRODUCT FOR TIME SERIES ANALYSIS

CROSS-REFERENCE TO RELATED APPLICATIONS

The present application claims benefit under 35 U.S.C. §119 of European Application No. EP07112036, filed Jul. 9, 2007, which is hereby incorporated herein in its entirety.

The present application is related to co-pending U.S. patent application Ser. No. 12/119,997, entitled "METHOD, DATA PROCESSING PROGRAM AND COMPUTER PROGRAM PRODUCT FOR DETERMINING A PERIODIC CYCLE OF TIME SERIES DATA", which is filed on even day herewith and assigned to the assignee of the present application.

BACKGROUND

This invention relates to time series analysis. Time series analysis and forecasting or extrapolating of future values is one of the basic tasks in quantitative analytics. Important application areas are census and econometrics: predicting national income, unemployment rates, birth rates, and the like; logistics and planning: predicting sales volumes, income, cost, price; medicine: predicting medical state of patients; or science: weather forecast, climate, global warming, and the like.

In the state of the art, a wide range of mathematical methods and algorithms have been proposed, such as seasonal-trend models, seasonal autoregressive integrated moving average (ARIMA) models, or the so-called exponential smoothing models. The basic idea of exponential smoothing (without seasonality and trend effects in the time series date to be considered) is to predict future values $y_{pred}(t+1)$ at time t+1 of a time series y(t) at time t, based on the series' known values from the past, with decreasing importance of less recent values:

$$ypred(t+1) := \alpha y(t) + (1-\alpha) ypred(t) = \alpha \Sigma k = 0 \ldots N-1(1-\alpha)^k y(t-k) \text{ with damping factor } 0 < \alpha < 1.$$

With trend and additive season comprise in the time series data, the so-called Holt-Winter model is obtained:

$$y_t = g_t + s_t + e_t$$

with $g_t = \alpha \cdot (y_t - s_{t-s}) + (1-\alpha) \cdot (g_{t-1} + \phi \cdot T_{t-1})$ being the general trend; ($\phi$~0.9 . . . 0.99 is trend damping);

with $T_t = \beta \cdot (g_t - g_{t-1}) + (1-\beta) \cdot \phi \cdot T_{t-1}$ being the incremental trend component at time t and $s_t = \delta \cdot (y_t - g_{t-1}) + (1-\delta) \cdot s_{t-s}$ being the seasonal component at time t.

For parameter initialization: e.g. $\alpha, \beta, \delta = 0.1 \ldots 0.3$; $\phi = 0.9 \ldots 0.99$; $g_0 = y_1$; $T_0$, $s_{k<1} = 0$ is used.

Additive trend/additive season (AA), no trend/no season (NN), no trend/additive season (NA), additive trend/no season (AN) are also covered by this model.

More generally, Pegels and Gardner have proposed a classification scheme which groups different exponential smoothing models by:

{kind of trend}*{additive or multiplicative season}

As a recursive procedure, an exponential smoothing data analysis process requires some computational effort to try to fit all the model types. Such a procedure could cause problems in terms of overfitting the data rather than finding the true nature of the data generating process. An experienced user could be able to select a model type by means of graphical analysis of a time series plot, but an inexperienced user might have some problems to make the right decisions for using formalized, stable and reliable criteria.

An overview of existing automated model selection methods has been given by E. S. Gardner Jr. published in Exponential Smoothing: The state of the art—Part II, 2005, http://www.bauer.uh.edu/gardner/. Gardner and McKenzie in Gardner E. S. Jr., McKenzie, Model identification in exponential smoothing, Journal of the Operational Research Society, 1988, no. 39, pp. 863-867, suggest a method of minimizing the variance of transformed time series. However, only additive trends and multiplicative seasonality are considered there. This approach was tested empirically by Tashman and Kruk, published in Tashman L. J., Kruk J. M., The use of protocols to select exponential smoothing procedures: A reconsideration of forecasting competitions, International Journal of Forecasting, 1996, no. 12, pp. 235-253 and Taylor in Taylor J. W., Exponential smoothing with a damped multiplicative trend, International Journal of Forecasting, 2003, no. 19, pp. 715-725. Alternative methods were developed by Shah, published in Shah C., Model selection in univariate time series forecasting using discriminant analysis, International Journal of Forecasting, 1997, no. 13, pp. 489-500: only two model types, without trend and seasonality as well as additive trend and multiplicative seasonality, are considered; and Meade published in Meade N., Evidence for the selection of forecasting methods, Journal of Forecasting, 2000, no. 19, pp. 515-535: no trend and seasonality, additive trend and no seasonality, damped additive trend and no seasonality have been considered therein. In these cases, there were also non-smoothing competing methods taken into account.

Optimizing the parameters is suggested by Hyndman as published in Hyndman R. J., Wheelwright S. C., Makridakis S., Forecasting: methods and applications, 3rd ed., 1998, John Wiley & Sons, New York. However, it is not defined which optimizing procedure is best for this purpose.

SUMMARY OF THE INVENTION

In one aspect, the invention provides method and apparatus, including computer program products, implementing and using techniques for time series analysis. Time series data is received. Variance information is determined for transformed time series data. An appropriate combination of trend and seasonality of the time series data is determined based on the variance information.

DESCRIPTION OF DRAWINGS

FIG. 10 a matrix containing the variances of transformed time series at different orders of normal and seasonal differentiation in accordance with one embodiment;

FIG. 11 a table showing analyzed behavior of the variance function at different slices of the matrix of FIG. 10 in accordance with one embodiment;

FIG. 12 different possibilities for each variance sequence V1, V2, V3 of FIG. 11 in accordance with one embodiment;

FIG. 13 selection of model types according to pattern of FIG. 12 in accordance with one embodiment;

Figure 1A:
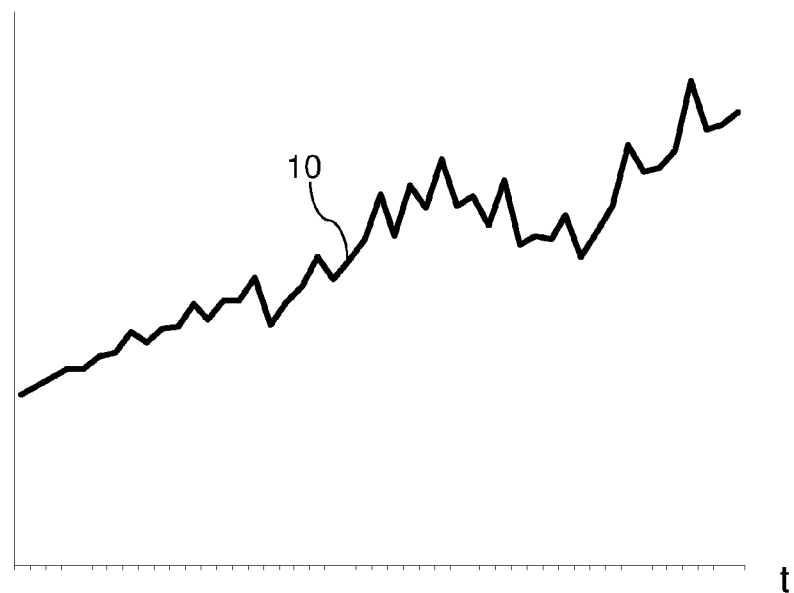
FIG. 1a an original time series representing quarterly trending GDP data used as an example for demonstration of a method in accordance with one embodiment.

In the drawings, like elements are referred to with like reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

According to various embodiments of the invention, methods for predicting future values of time series data are proposed. One method includes exponentially smoothing the time series data and includes at least one of the steps: building possible combinations of trend types, considering non-trend, additive trend and multiplicative trend, and seasonality types, considering non-trend, additive trend and multiplicative seasonality, selecting the most appropriate combination of trend and seasonality types for value prediction of a specific time series data, differentiating the time series data 0, 1 and 2 times, differentiating the differentiated time series data according to seasonal cycles 0, 1 and 2 times, analyzing the variances of the differentiated data, arranging the variances in a matrix form, selecting a smoothing model based on the variance matrix, determining parameters for the smoothing model, and optimizing the parameters for the smoothing model.

In short, the approach in one embodiment works as follows: A time series is differentiated 0, 1 and 2 times. Each of these transformed series is then seasonally differentiated 0, 1 and 2 times. A missing observation results in missing observations at all the points where the observation would be used in the transformation. Nine transformed series are represented by their variance, which yields a 3×3 matrix. The approach is based on an analysis of monotony at different slices of this matrix, compared with what would happen in case of an "ideal" model of each of nine feasible types.

Transforming a time series here means subtracting members of the time series from each other. Plain differentiation refers to transforming a time series $x(1), x(2), \ldots, x(i), \ldots, x(n)$ typically in the following way: $x(2)-x(1), x(3)-x(2), \ldots, x(i+1)-x(i), \ldots, x(n)-x(n-1)$. In seasonal differentiation, where one seasonal cycle consists of $N_{season}$ points, the transformed time series is $x(i)-x(i-N_{season})$. As mentioned, it is possible to combine plain differentiation and seasonal differentiation.

Variance typically refers to sample variance $$s_n = \frac{1}{n}\sum_{i=1}^{n}(x(i)-\bar{x})^2$$

where $\bar{x}$ is the sample mean. Other similar definitions for variance may be equally applicable in various embodiments of the invention.

Having selected the model type, optimum smoothing parameters are determined in a fitting process. The optimum smoothing parameters, in general, should reflect the relative weight of more recent observations when fitting, stabilizing the forecasts in series with few turning points, and making the forecasts more flexible when turning points occur more frequently.

The optimizing algorithm according to one embodiment of the invention enables finding the optimum point within the feasible set of (0,1) for each parameter. The optimizing algorithm takes the restrictions into account, uses the gradient and allows for fine-tuning of single parameters at the end, in case the optimum is on the "border" of the set.

Significant input for the method according to one embodiment of the invention is the information about seasonal cycles (seasonality) in the time series data analyzed. Therefore an automatic procedure described hereafter is used to extract the seasonality from the time series data. Another possibility, if a-priori-know-how from an expert user is available, would be to take this information as input for the process in accordance with one embodiment.

To get the seasonal input information, a method for determining a periodic cycle of time series data may be used, which includes providing a frequency spectrum of the data and wherein at least one of the steps of filtering the frequency spectrum for reducing noise of the data; truncating the frequency spectrum at low frequencies; weighting high frequency contributions over low frequency contributions of the frequency spectrum is performed.

The approach is based on the Fast Fourier Transform (FFT) procedure, summarized in many publications, e.g. described by J. Stoer in Numerische Mathematik 1, Springer-Verlag, Berlin Heidelberg 1993; or by B. Harris in Spectral analysis of time series, John Wiley & Sons, New York 1967. The Fourier transform $F_k$ is $$F_k = \sum_{i=0}^{T-1} Y_t \cdot e^{-\frac{2\pi i}{T}\cdot tk}$$

with Y(t) is denoting the original time series, time $t=0, \ldots, T-1$, $k=0, \ldots, T-1$. Unless T equals a power of 2, the time series is zero-filled at the end so that this condition is fulfilled. Further, this F(k) output is processed until a periodicity (as number of observations per cycle) and its relative weight (among other periodicities) are finally found. This FFT-based spectral analysis is combined with a new method for detecting separate distinct periodic cycles or seasonalities, each of them being a composition of a basic frequency and its harmonics.

Both input and output of the FFT are complex numbers. As all time series considered here are real numbers, the real part (real) of the input equals the observed value of time series and the imaginary part (imag) of the input is always 0. The output is summarized into a real number again by calculating the absolute value of the complex numbers and scaled according to time t, yielding a standard periodogram. $P_k$ is:

$$P_k = \frac{\sqrt{\text{real}(F_k)^2 + \text{imag}(F_k)^2}}{T/2}$$

With $F_k$ the Fourier transform and T the time, where the k-th observation is associated with frequency k/T and, consequently, periodicity T/k. For example, the 17-th output observation, in a (zero-filled) series of 64 represents a frequency of 16/64=0.25, and a periodicity of 64/16=4. A relatively high value could suggest quarterly data, a low value that it has not been fitted to any sinusoidal function of wavelength 4. This standard FFT output is then processed in the manner described hereafter.

Advantageously, before processing by FFT, an ordinary least squares fit of the equation Y(t)=a+bt+e(t) is performed on the input time series data and the e(t) series (deviations from a straight line) is further considered. This removes long-term trend from data before the Fourier transformation which helps to reduce the weight of the spectral peak at frequency 0 and infinite periodicity. By removing a constant and a linear trend, the Fourier coefficient P(0) is reduced to zero, which is desirable, as most business or economic time series are trending, sometimes also in a long term. Trending is even more probable when the sample is short. Not only is an irrelevant peak appearing at frequency 0 eliminated, but also its die-out effects at frequencies 1/T, 2/T, 3/T, etc. are reduced. Without that reduction, and with a strong trend, these die-out effects can strongly outweigh the relevant peaks of seasonality, rendering them invisible. Consequently and favorably, the coefficient P(0) is not taken into consideration any more.

Figure 1B:
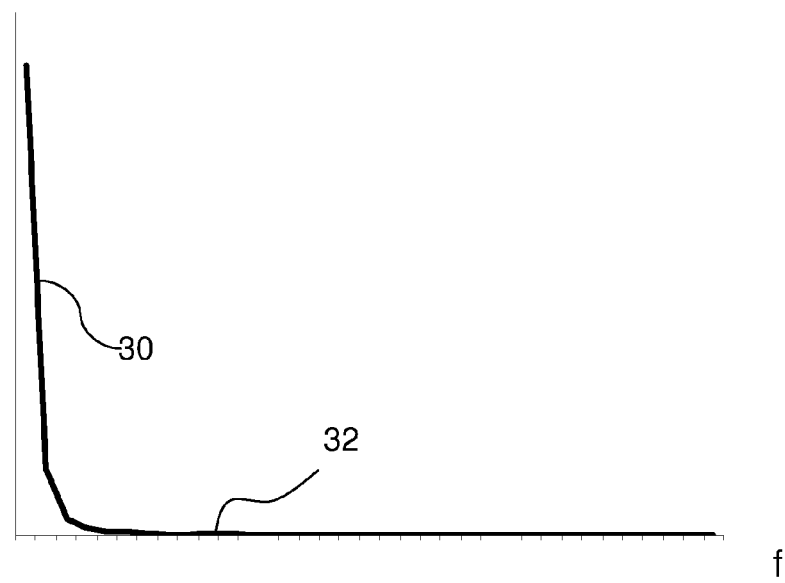
FIG. 1b a Fast Fourier Transform (FFT) output of the time series data of FIG. 1a in accordance with one embodiment; the input is left not detrended.
Figure 1C:
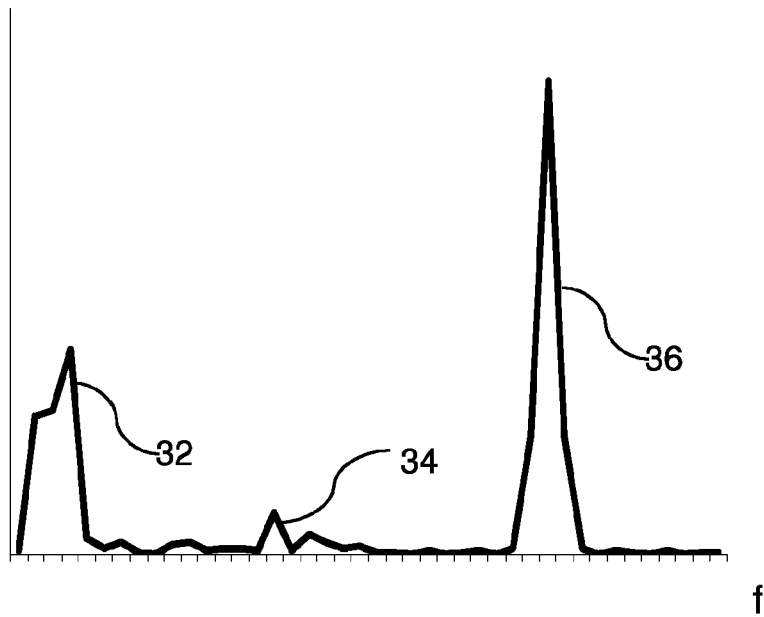
FIG. 1c a FFT-output of the time series data of FIG. 1a in accordance with one embodiment; the input is now detrended, peaks at frequencies 2f and 4f are visible.

FIG. 1a shows an original time series data 10 representing by way of example a quarterly trending GDP (gross domestic product) data as function of time t, used as an example for demonstration of a method in accordance with one embodiment. The curve increases in time and exhibits some structure superimposed on the increasing curve. Next FIG. 1b represents the FFT processed data as a function of the frequency f, without any detrending process, thus exhibiting a very strong peak 30 at low frequency and a small peak at a higher frequency. Referring now to FIG. 1c the advantage of the detrending process with the least squares fit is demonstrated where the possible long term trend represented by peak 30 (FIG. 1b) is completely removed. Thus peak 32 is clearly visible and additional peaks 34, 36 can be seen at still higher frequencies f.

Figure 2:
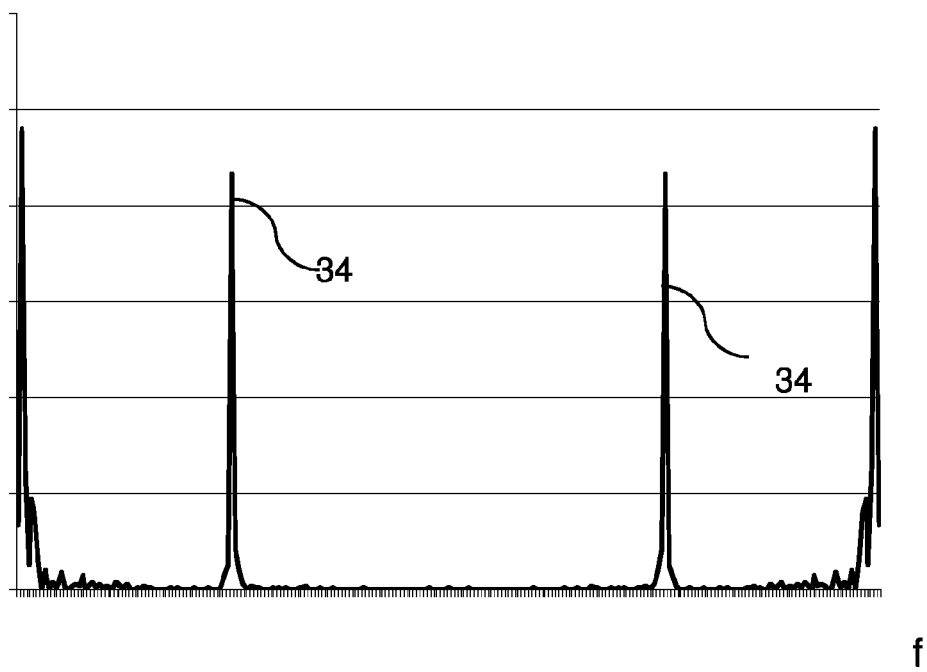
FIG. 2 an entire FFT-output showing that the upper half of the frequency spectrum is just a reflected copy of the lower half and need not be taken into account in accordance with one embodiment.

Frequencies higher than f=0.5 correspond to periodicities 1/f lower than 2. As the method is preferably based on integer periodicity 1/f, 2 is the lowest candidate possible. This is the reason why preferably only approximately half of the remaining P(k) coefficients are taken into account, i.e. they start at k=1 and end at the first local minimum after the middle value. This choice of the end point reflects the fact that also 1/f=2 is considered as a candidate and its relative weight should not be underestimated if it really should be a significant periodicity. A mathematical justification for stopping at half the maximum frequency is the fact that the Fourier Transform X(f) of a real-valued time series x(t) has an even real part, Re(X(−f))=Re(X(f)), and an odd imaginary part, Im(X(−f))=−Im(X(f)), hence the absolute value $\sqrt{(\text{Re}^2+\text{Im}^2)}$ is an even function with period T, and therefore the second half of the frequency spectrum is just a reflected copy of the first part. This fact is demonstrated in FIG. 2 showing the whole frequency spectrum with peak 32 over frequency f.

The following steps in accordance with one embodiment serve to separate the desired significant frequency peaks from the noise in the FFT spectrum, which arise from several sources: noise in the original data, noise introduced by non-perfect detrending and by the finite sampling length.

According to one embodiment the remaining values are filtered by means of so called Bartlett weights. Let N denote the width of weighting window, N is odd and has its peak in the middle. Let j=0, . . . , N−1 denote the distance from the middle of the window which is symmetric. The weights $w_j$ are then defined as $$w_j = \frac{\frac{N+1}{2} - j - 1}{\left(\frac{N+1}{2} - 1\right)^2}$$

A parameter for N of N=19 is chosen advantageously. The value of N is an empirical value achieved by tests performed for various data sets considering climate data, weather data, economical data etc. Thus noise can be filtered out from the periodogram. As further processing is based on partitioning the periodogram with respect to its monotony, significant minimum and maximum points must be found. Also, a very high peak is distributed within the window width, forming a clearly separable partition of high-weighted frequencies.

Figure 3:
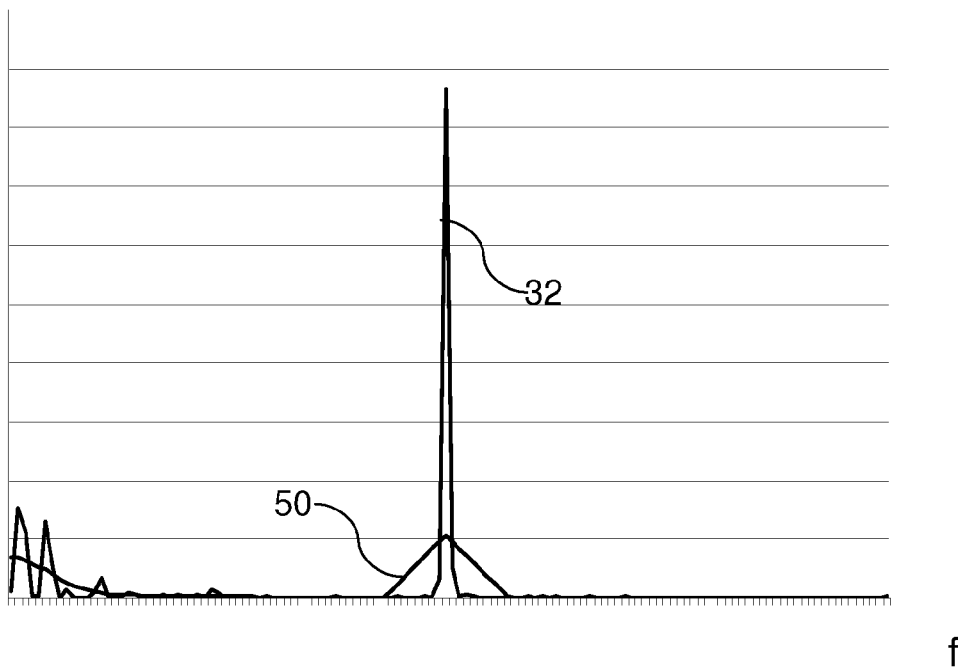
FIG. 3 an unfiltered and a filtered periodogram after the application of Bartlett weights in accordance with one embodiment.

The effect of the described filtering process can be seen in FIG. 3, where the filtered curve 50 is shown. The abscissa in FIG. 3 is the frequency f which represents the reciprocal value of the periodicity 1/f. The spectrum is thus smoothed and closely neighbored tiny peaks are merged.

Figure 4:
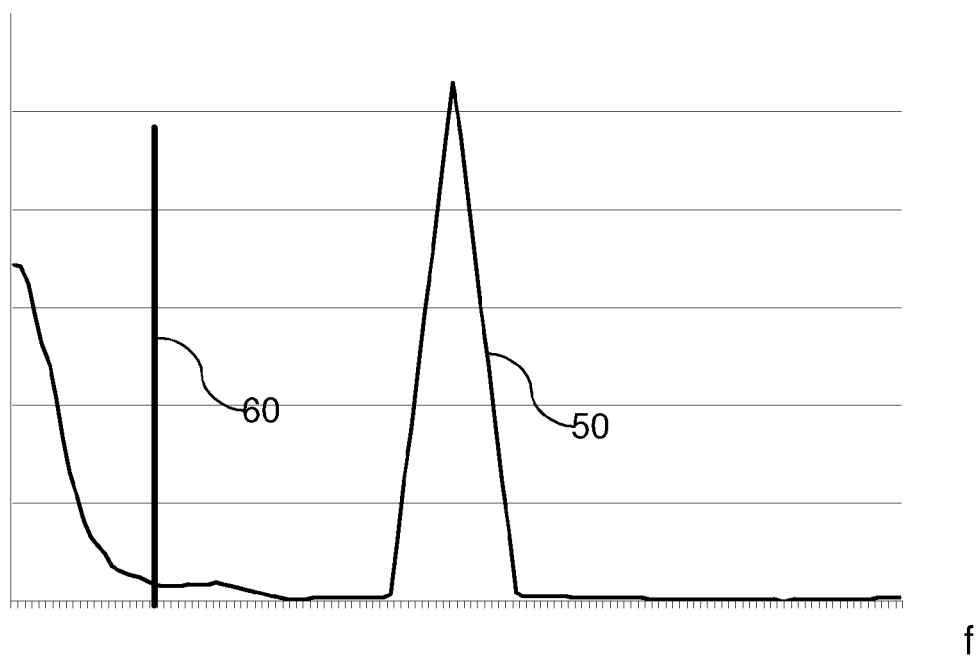
FIG. 4 a truncation of the low frequency border of the periodogram in accordance with one embodiment.

As another feature of one embodiment, the low-frequency border of the periodogram is truncated if the low-frequency border is downward-sloping towards higher frequencies; this is due to unremoved non-linearity in trend or stochastic long-term trends, which can produce an effect of very long "seasonal" waves occurring. The first local minimum is the left-border of the periodogram analyzed. The truncation of the low frequency border is shown in FIG. 4 by the truncation limit 60. Thus the effects of finite sampling length and non-perfect detrending are eliminated.

The following step of one embodiment, another means for dampening the influence of finite sampling length and non-perfect detrending, covers the weighting of the values at every frequency: letting P(i) denote i-th value of the periodogram before truncating, i=1, 2, . . . , the new values P(i)* equal:

$$P_i^* = P_i \cdot (1 - e^{-ci}) \text{ with } c = \frac{\log(1 - 0.8)}{1 - \frac{T}{2}}$$

(T=periodogram size before truncating).

The impact of the weighting is regulated by the constant c. Advantageously, the constant c is chosen such that c<~1/N is fulfilled. With the specification above, the weight in the middle of the periodogram before left-truncating (T/2) is reaching 80% (0.8).

These weights vary from 0 to 1, converging asymptotically towards 1 from the lower to the higher frequencies. This reflects the relation of the sample-size and the possible seasonal wave. Obviously, a short time series containing only 2 or 3 full cycles is very prone to misspecification of the seasonality. On the other hand, as it is not known how many cycles the sample contains, so the low-frequency end (before truncating) starts at one cycle, thus including all the possibilities. The longer the seasonal wave assumed, the greater the requirements for the length of the sample and the "shorter" the same series becomes from subjective point of view of an empirical researcher. These weights reduce the periodogram values according to this subjective "shortness" of the time series, reducing the possible short-sample bias effects for the low frequencies and leaving the high frequencies almost unchanged.

Figure 5:
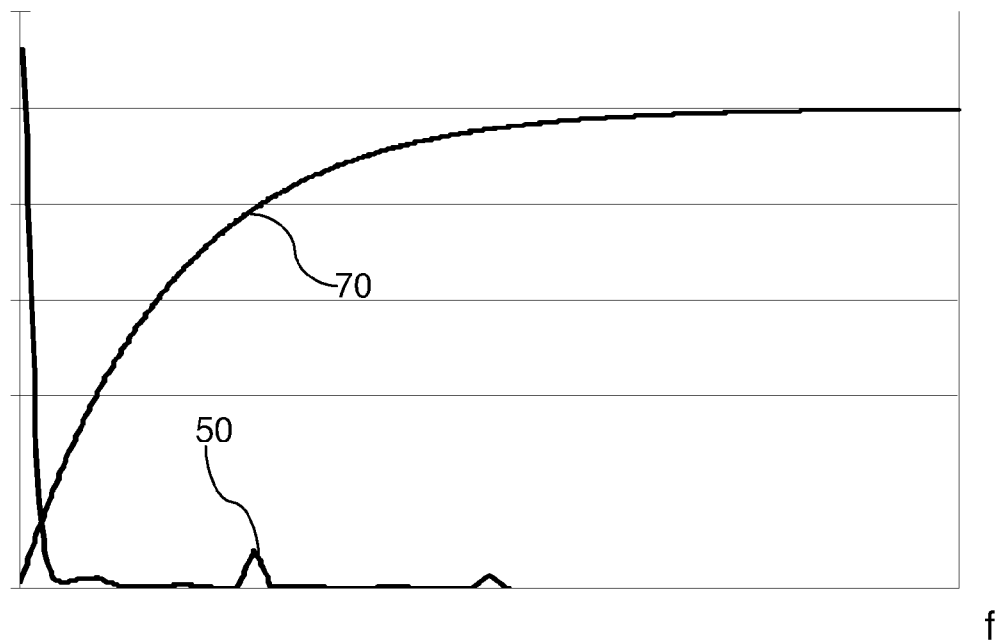
FIG. 5 an unweighted periodogram and weight function applied for weighting the frequency output in accordance with one embodiment.
Figure 6:
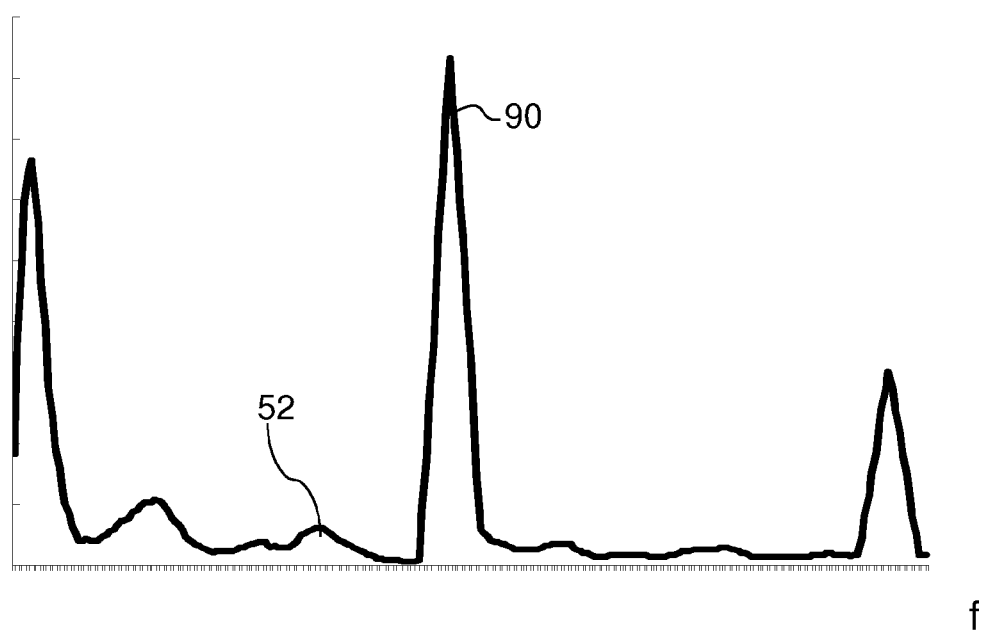
FIG. 6 a weighted periodogram in accordance with one embodiment.

FIG. 5 shows the unweighted periodogram 50 and the weight function 70 applied for weighting the frequency output whereas in FIG. 6 shows the weighted periodogram 52. The weight function starts with a steep increase from zero and becomes a constant at higher frequencies similar to a function $1-e^{-cx}$. The constant c, i.e. the slope near zero point, correlates with N, as mentioned above and should be sufficiently small to extensively eliminate a remaining intensity from the peak near zero.

The last two steps of the seasonality determination process, namely truncating at low frequencies and weighting the periodogram serve, in general, the same purpose: to eliminate the impact of accidental pattern recognition with longer waves. This is why the integer index of weighting, i, starts at the point which had already been cut off before. Thus the overall weight of a partition is reduced if there is an upswing in the periodogram at a very low frequency and the filtering was still not strong enough to prepare a monotonous downward-sloping origin before which to cut off. On the other hand, the periodogram values should not be pulled down too strongly, as there can be some significant longer periodicity. This setting of the constant is therefore a suitable compromise between these two mutually exclusive objectives.

Figure 7:
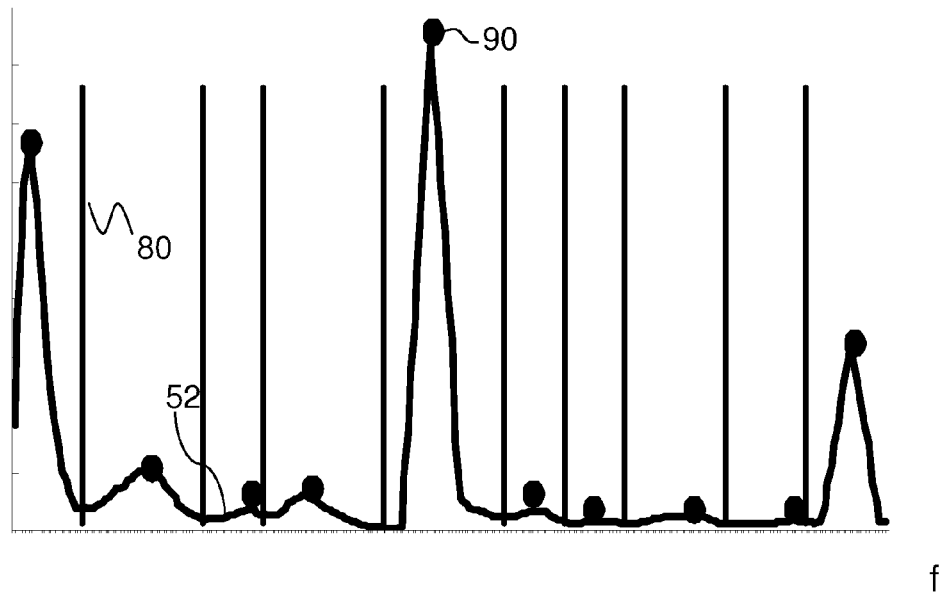
FIG. 7 a partitioning process of the transformed periodogram according to monotony of the different partitions in accordance with one embodiment.

Alternatively, the filtered, truncated and weighted periodogram can be partitioned according to its monotony, which is shown in FIG. 7. The borders between partitions 80 are local minima, and partition "centers"–local maxima 90.

Advantageously, neighboring partitions can be merged, starting with the partition centered about the global maximum. If the minimum on either border of the partition centered about the global maximum is no less than 30%, the two partitions are merged and the new center is set to the higher of the two maxima. The nearest local minima outside the 30%-limit are set as the final border of a partition. This procedure is repeated then for the highest maximum of the ones that have not yet been processed, until every maximum is checked for this possibility.

Figure 8:
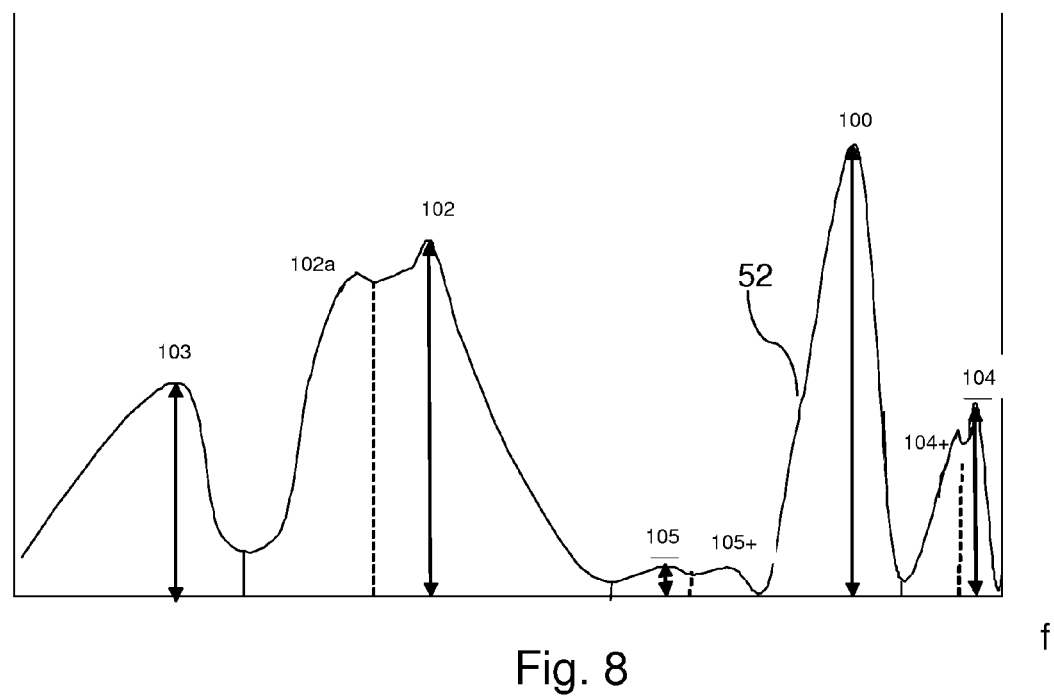
FIG. 8 a merging process of adjacent peaks of the periodogram in accordance with one embodiment.

First, local maxima and minima are found, as shown in FIG. 8. The start point will be the global maximum 100, and the neighboring minima are more than 30% lower, so these are final borders of the partition 100. Then, the start point will be at the second greatest value, that is, 102. The local minimum on the left of it is less than 30% lower than this local maximum, so the partition on the left 102+ is merged with partition 102. Third greatest value 102+ has already been used, so the fourth one is taken next to form partition 103, just like 100. Further, mergers are performed on 104, 104+ and 105, 105+.

Each partition 100 through 105+ is a potential seasonality wave. Preferably its relative weight is calculated as a sum of the (filtered and weighted) periodogram values divided by the sum of all periodogram values. The relative weights of the seasonalities all sum up to 100%. Each partition 100 through 105+ is then represented by one frequency value. This is calculated as weighted average of frequencies within the partition, with the ORIGINAL periodogram values (not weighted and not filtered) as weights. This improves the precision of the final representative frequency of a partition. Not all periodogram points of one partition are taken into account: the periodogram is truncated left and right at the local minima closest to the peak in the original periodogram. This is due to possible precision problems when the partition is asymmetric with respect to the maximum, in case of: lower frequencies overlapped by unremoved long-term influences, data with very clear seasonal pattern and little noise, containing no "random" maximum points in the neighborhood of the true seasonality point, which extends the partition excessively to the right or to the left.

All partitions with weight less than 5% are deleted. They are assumed to be random and could cause problems in further processing. In FIG. 8, partitions 105 and 104 are likely to be deleted in this way.

If there is a peak at frequency f, the peak is likely to appear also at 2*f, 3*f etc. Sometimes the peak at 2*f is even heavier than the one at 4*f with quarterly data. This is due to the exact pattern of seasonality (a sub-cycle of 2*f can be modeled with higher amplitude than the main one of 4*f) and to the fact that the FFT method reproduces the swings by means of sine and cosine functions and if the shape of a time series' seasonal pattern does not match them exactly, it uses multiples of the "true" frequency for fine-tuning. The extreme (theoretical) example is a sequence of slopes, which produces a peak at its relevant periodicity and die-out effects at shorter ones. Such peaks can be understood as higher harmonics of the base oscillations. This is why regarding such peaks separately could be misleading.

The algorithm aggregates such multiples, adding the weights of higher frequencies to their respective lower ones (if any) and then deleting the higher ones. Removing the seasonality partitions with weight less than 5% prevents a random low-frequency partition of periodogram from becoming a base for such aggregation. Each of the calculated periodicities (inverses of partitions' representative frequency; ordered by the weight derived from the periodogram) is examined to determine whether it is located in the neighborhood (+/−0.2) of an integer number (which is a condition for this periodicity to be the true one). If so, the algorithm searches for a partition with a representative frequency in the neighborhood (+/−0.02, with frequency between 0 and 1) of a double, triple, and so on, of the frequency of the partition examined and, once the partition is found, performs the merger.

From the point of view of the methods supported (ARIMA, exponential smoothing, seasonal-trend decomposition) a choice of longer periodicity (in case of encompassing ones) makes it possible to model both without loss of information. Seasonal-trend decomposition supports modeling of multiple interfering seasonality cycles (provided the time series is sufficiently long), but using single longer seasonality—in case of encompassing periodicity lengths—is also preferable, if the series is long enough.

At the end of the seasonality determination process, it is decided whether the seasonality calculated should be applied at all or if this pattern is so weak that an introduction of a seasonal model would lead to overparametrisation. One hint is the weight of the greatest periodicity partition. The lower the weight, the higher is the probability of a random peak (relatively balanced distribution of weight among partitions). However, this can also be misleading when the impact of filtering is high. A more formal criterion is the ratio S:

$$S = \frac{\sum_{i=L}^{R} W_i}{\sum_{all} W_i}$$

with W(i)=original periodogram values, not filtered, but weighted using the general weight function described; L=left R=right border of weighted average calculation. This ratio is calculated for every partition. If the highest ratio is above 0.2, seasonality is assumed. Otherwise, seasonality is not assumed; this is conclusion from empirical tests, in which series with no seasonal behavior take values of 0-0.15, and one with clear seasonal behavior—above 0.5 at this place.

Figure 9:
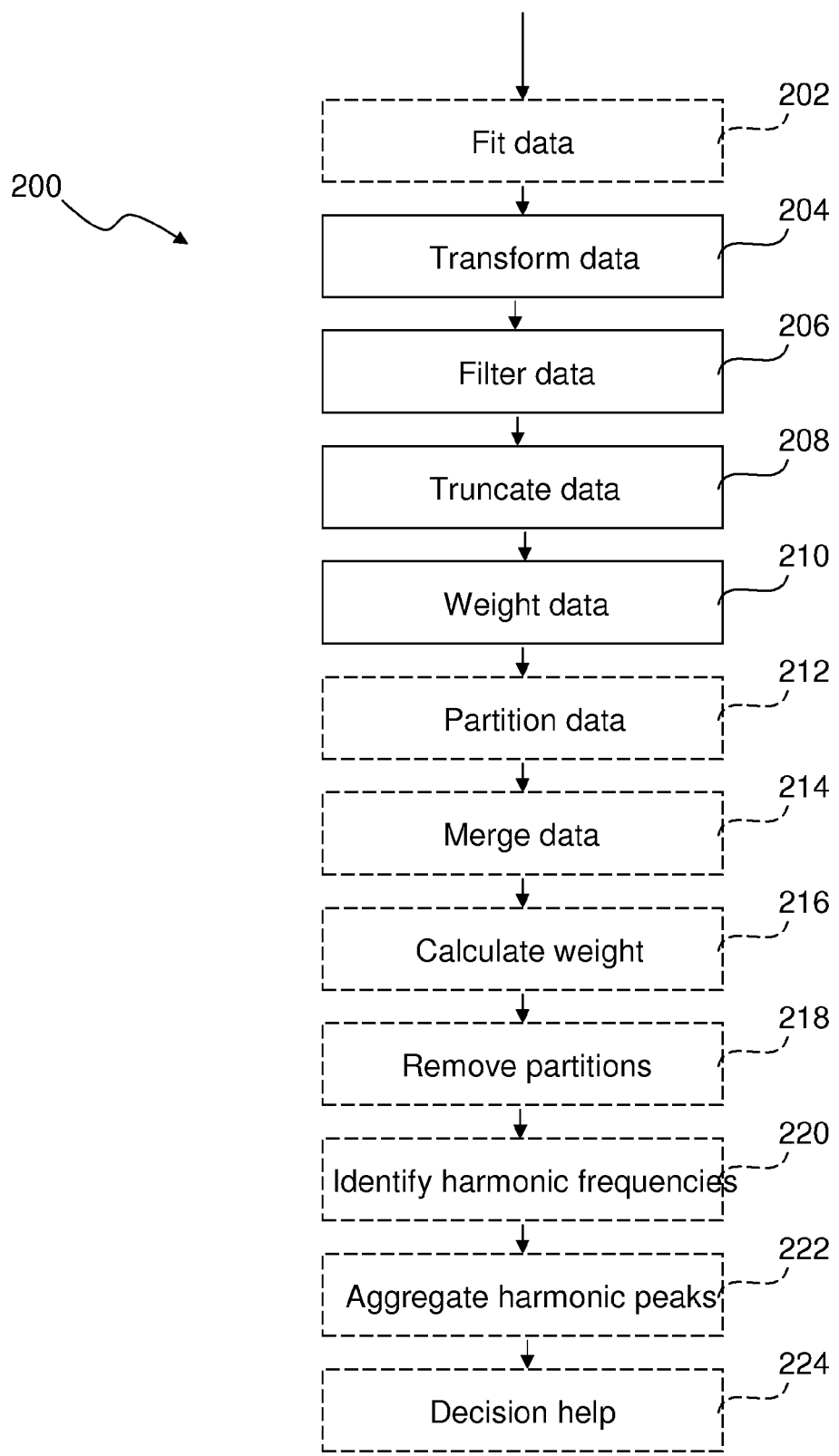
FIG. 9 a flowchart of data processing steps for automatically determining the seasonality of the time series data in accordance with one embodiment.

FIG. 9 shows an overall flowchart 200 of the data processing steps involved in performing a method in accordance with one embodiment of the invention.

Time series data are entered and optionally fitted with a least squares fit in first step 202. The least square fit favorably eliminates long term trends in the data.

Then in the main step 204 a Fast Fourier Transformation of the time series data is performed.

Next, data are filtered in step 206 in order to separate the desired significant frequency peaks from the noise in the FFT spectrum.

Additionally the FFT data are truncated at low frequencies in step 208 in order to remove non-linearity in trend or stochastic long-term trends.

The next step 210 is weighting high frequency contributions over low frequency contributions of the frequency spectrum in order to eliminate the impact of accidental pattern recognition with longer waves.

In an optional additional step 212 the processed FFT spectrum is partitioned according to local minima or maxima.

Optionally, neighboring partitions are merged in optional step 214 in order to magnify main seasonal cycles in the data.

Further, in optional step 216 relative weights for the partitions may be calculated.

In optional step 218 partitions with too low weight are removed to concentrate the search on main seasonal cycles of the data.

In a further optional step 220 harmonic frequencies may be identified.

These harmonic peaks may optionally be aggregated in optionally step 222 in order to remove higher harmonics due to artificial effects of the base function.

Additional optional step 224 which covers a help to decide whether a found seasonality pattern is taken for real may be included in the whole data processing flow at the end. The seasonality pattern is an input parameter for the exponential smoothing of the time series data.

Next, a method for predicting future values of time series data, which includes exponentially smoothing the time series data with model parameters, if information on seasonal cycles is available, will be described in detail.

In FIG. 10, the elements of the matrix contain the variances of transformed time series data at different orders of normal (normal=trend) and seasonal differentiating. Time series data have been differentiated 0, 1 and 2 times for determining the trend type as well as 0, 1 and 2 times according to seasonal cycle for determining the seasonality type. The nine variance matrix elements are labeled from V(0,0) through V(2,2) for better understanding.

Next, the behavior of these functions at different slices of this matrix is analyzed. The possible situations are shown in FIG. 11. For each possible sequence (column, row, diagonal, etc.) the three analyzed matrix elements (variances) V1, V2, V3 describe the trend and seasonal behavior: growing, 0, 1, 2. V1, V2, V3 are introduced to generally denote the matrix elements in each row and column for an analyzed sequence.

For each sequence V1 related to V2 related to V3 there are three possibilities for behavior which are shown in FIG. 12. Obviously, when there are only elements compared in a sequence, a minimum is not possible. The different conditions which are possible are correlated with the different labels falling, growing or minimum. Additionally, arrows are shown which depict these behaviors.

Having identified these patterns, the selection of the appropriate model type is decided, shown in the decision table of FIG. 13. According to the different analyzed sequences, already shown in FIG. 11, labeled with letters A through F and taking into account the observed behavior (falling, growing or minimum), described in FIG. 12, an appropriate model type is selected, with no tendency, applicative tendency, or multiplicative tendency. These model types are labeled with a letter combination trend/seasonality: NN through MN, as demonstrated in FIG. 13. For example D growing and A growing yields NN, whereas D falling, B growing and A growing yields NA as suitable model.

It is difficult to distinguish between additive and multiplicative seasonality when there is no trend, so an additive seasonality is then selected by default as a safe-side solution. However, both ways should yield almost identical results. Therefore, the combination NM is not considered separately.

The method has got this safe-side inclination in three more cases:
  a multiplicative seasonality pattern has to be obvious (clearly growing amplitude of oscillations) for the multiplicative seasonality to be recognized with additive trend; for weak multiplicative seasonality with a strong additive trend, model tends to be recognized as AA;
  a seasonality pattern has to be strong with multiplicative trend; weak seasonality with strong multiplicative trend makes MN recognition more probable;
  an amplitude of multiplicative seasonality over a multiplicative trend must be strongly growing/falling to recognize the model as MM, otherwise it tends to MA.

The idea behind this approach is to remove expected data patterns (trend and seasonality) and then observe the variance. Differentiating is the method of removing some behavior and its advantage is that there is no global function fitted which enables to take full profit of exponential smoothing's flexibility concerning turning points. If a 3×3 matrix is defined, incrementing a row means removing trend once, incrementing a column removing seasonality once. This is achieved by normal or seasonal differentiating. Obviously, seasonal differentiating removes both trend and seasonality. That is why a series with seasonality removed more times than trend cannot be produced, and hence variance at V(0,1), V(0,2) and V(1,2) cannot be observed.

Figures 14, 15:
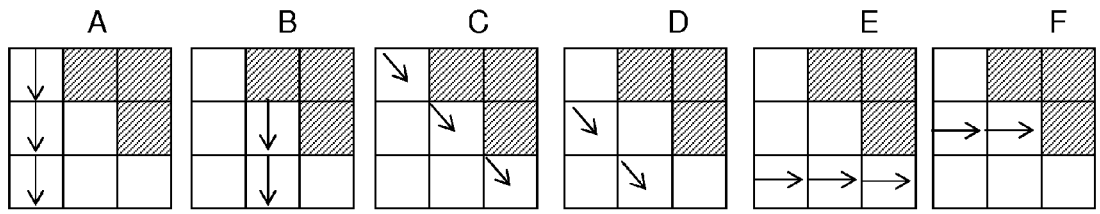
FIG. 14 points of optimum variance (shadowed square) for a model defined on the borders of the variance matrix of FIG. 10 in accordance with one embodiment.
FIG. 15 analyzed paths in the variance matrix of FIG. 10.

Should a model be, as defined, on the borders of the table in FIG. 14, the point of optimum variance is denoted by a black square. For example, in the case of additive trend and additive seasonality (AA) this optimum point lies on the element V(1,1) of the variance matrix. The streaked fields indicate the variances V(0,1), V(0,2) and V(1,2) which cannot be observed as mentioned above. Nevertheless it can happen that the point of optimum variance lies theoretically in a streaked field. In this case this value cannot be reached.

Figure 16:
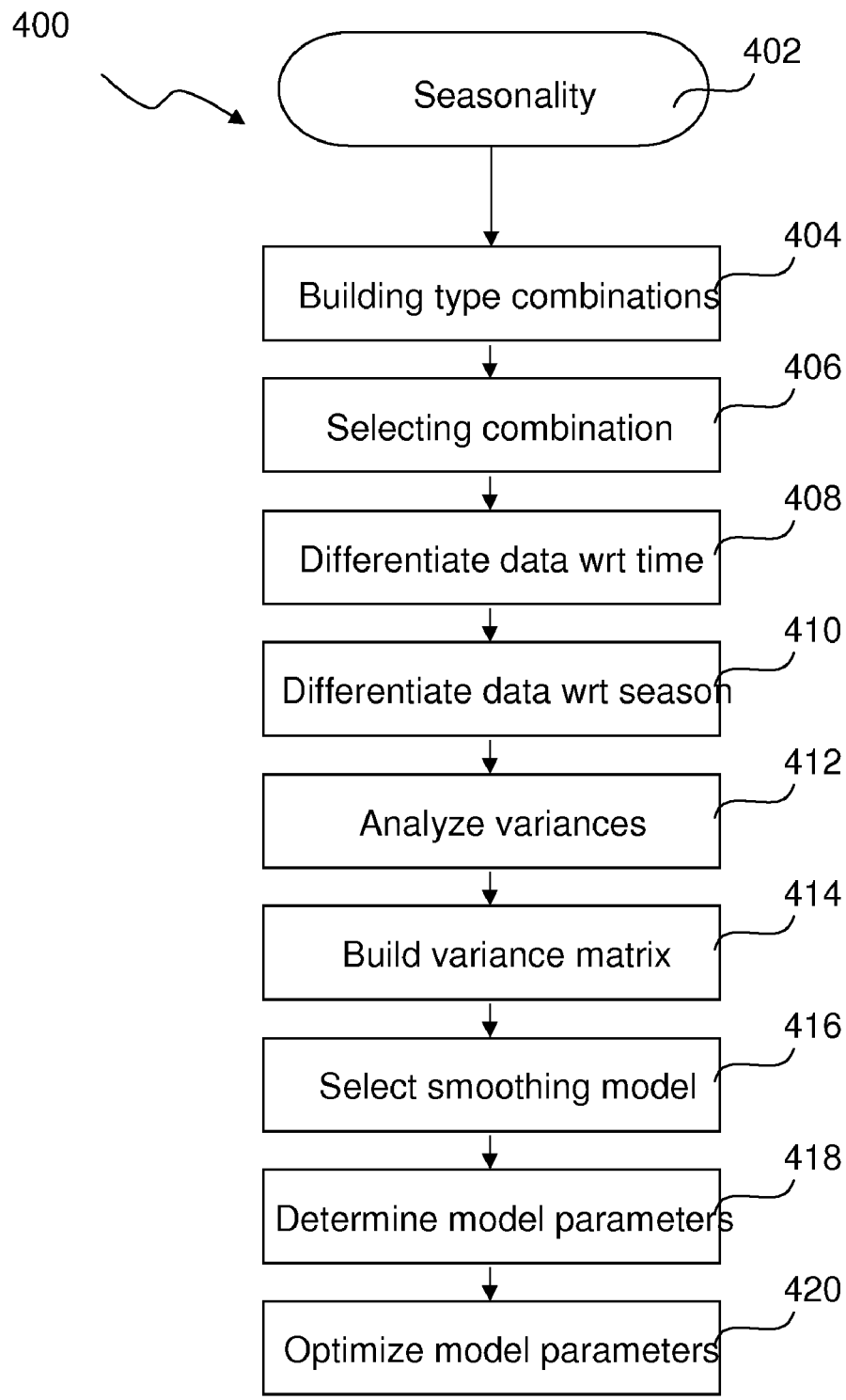
FIG. 16 a flowchart of preferred data processing steps for performing a method in accordance with one embodiment.

As demonstrated in FIG. 15, the 6 paths analyzed in the variance matrix as demonstrated in FIG. 13, correspond to the following paths of the matrices shown in FIG. 16. For example, path C corresponds to analyzing the variance values through the diagonal of the matrix.

Advantageously changes in the variance resulting from differentiating can be interpreted in 3 ways:
- a decline as a result from removing a data pattern or approaching to the optimum point in 1 dimension; for example, by normal differentiating of an AN time series the additive trend is removed, and in MN—the multiplicative one is partially removed;
- an increase as a result of removing a pattern although it does not exist any more (overdifferentiating); for example, by any differentiating of NN series the variance of the white noise is just inflated;
- an increase as a result of differentiating data in a false dimension, without having removed the actual pattern inside it; for example, normal differentiating of a series without trend and with seasonality inflates the variance of seasonal effects but they cannot be removed.

When option 1 and option 2 occur at the same time, it is assumed that possibility 1 is dominating. However, with a mixture of option 1 and option 3, the result can be unpredictable.

Next, the nine possible model types are analyzed:

Non-trend trend type and non-trend seasonality NN: On path D, the variance grows because of overdifferentiating. The same is valid for path A.

Additive trend type and non-trend seasonality AN: On path D, the variance grows because of overdifferentiating. Path A contains the optimum point in its middle so there must be a minimum.

Non-trend trend type and additive seasonality NA: Moving along D, seasonality is removed, so the variance must fall. On B, however, the seasonality is removed and headed for overdifferentiating, so the variance is growing. On A then, unremoved seasonality is "pulled behind" and overdifferentiated with respect to trend so both the effects (2) and (3) account for growth in variance.

Additive trend type and additive seasonality AA: Moving along D, the seasonality is removed and trend overdifferentiated but the first effect is stronger. On B, the seasonality is moved out of the optimum point which means overdifferentiating and growth. Then path A is analyzed. If the variance does not grow there, it is assumed that there is some trend. However, there are 2 effects interfering here: (1) out of removing trend and (2) out of "pulling behind" unremoved seasonality. It is possible then that a series with strong amplitude of seasonal deviations and relatively weak trend yields strong effect (3) series is then qualified as NA. Additivity of the seasonality is confirmed by a minimum on C (crossing the optimum point) and E (removing seasonality and then over differentiating with already overdifferentiated trend).

Additive trend type and multiplicative seasonality AM: On path D, the trend is overdifferentiated but the seasonality is partially removed so effect (1) overweighs (2) and variance falls. On path B, there is overdifferentiating and "pulling behind" unremoved seasonality who both inflate the variance. Path A behaves similarly to the AA case, only the effect (3) is relatively stronger which makes a growth and NA classification more probable if the trend strength should be weak compared with the seasonality amplitude. A fall in variance along C or E is symptomatic for AM. (contrasted with AA): in case of C, both trend and seasonality are removed jumping from (2,2) to (3,3) and the trend overdifferentiating effect is assumed to be much weaker than removing further part of seasonality pattern; in case of E, the seasonality is removed 2 times at overdifferentiated trend so there is actually only effect (1) working. Should any of these 2 symptoms occur, AM is preferred to AA.

Multiplicative trend type and non-trend seasonality MN: On D, the trend is removed and seasonality "overremoved"—effect (1) assumably overweighs (2). On B, there is also a fall as the trend is removed on top of "overremoved" seasonality. Now it is tested for the presence of seasonal patterns. Three conditions must be fulfilled if there are no seasonal patterns: there is nothing more to be removed along E and F so there must be a rise in variance because of overdifferentiating and A ends up at the optimum point so the variance is falling there.

Multiplicative trend type and additive seasonality MA: There is a fall on both B and D as they end up in the optimum point. The presence of seasonality is assumed when at least one of the three symptoms occurs: variance along A is not falling (which means there is seasonality "pulled behind" with normal differentiating and effect (3) dominates effect (1) of removing trend), E is not growing (which means we cross the optimum point or end up there) or F is falling (which means we remove seasonality and effect (1) pushes down the variance in spite of "pulling behind" unremoved trend). Non-falling E indicates there is no evidence for multiplicative seasonality so additive is assumed.

Multiplicative trend type and multiplicative seasonality MM: The difference between MM and MA can only be deducted from falling (and not minimum) E path that indicates ending up in the optimum point as no other paths run along those 2 optimum points.

"Multiplicative" trends and seasonal patterns are not always removed by double differentiating—there can be more iterations leading to the optimum point, the second row and column mean therefore "more than 1 differentiating" which in this framework can be represented by second differences without loss of generality.

The $9^{th}$ possible type NM can be neglected because it cannot be distinguished from type NA.

Time series data classified with "multiplicative trend" can in fact be modeled in three ways: multiplicative, dampened multiplicative, dampened additive.

As it is relatively difficult, even graphically, to differentiate between these models, all three types are fitted ((1) encompasses (2)) and the one yielding the best one-step forecasting MSE (MSE=mean square error) is finally selected. Preferably, the function $y_{pred}(t+1)$ is used for fitting, wherein $$y_{pred}(t+1):=\alpha y(t)+(1-\alpha)y_{pred}(t)=\alpha\Sigma_{k=0\ldots N-1}(1-\alpha)^k y(t-k),$$ with damping factor $0<\alpha<1$.

However other exponential smoothing functions can also be used which exhibit parameters for trend and seasonal behavior. Such a function is, e.g. given by the known Holt-Winter model described above.

The sequence of paths considered has been established according to the stability of patterns on each path. The B and D labels are always indicating correct model group. Empirical random simulations of various series types confirmed this observation. Therefore they are considered first, whereas E or F labels are considered at the end only in certain models, as they are not stable in some others.

The number of smoothing parameters varies from a single smoothing parameter (models without trend or seasonality) to smoothing parameters (dampened trend and seasonality). The optimum parameters minimize any synthetic measure of ex post forecast error (e.g. MSE of one-step-ahead prediction). All the parameters are restricted to a set of (0;1). Thorough empirical study has shown that the MSE is not a wild function within the feasible set, but it is relatively difficult to find a starting value which has no saddle points in its way to the minimum (which is necessary for the Newton-Raphson procedure). The functions bend rapidly short before the minimum, representing a negative convexity over large areas. It is also possible that the whole area is not convex, as the true minimum lies beyond the feasible set. This is why a pure gradient procedure is applied $$\Delta P^{(i)} = -\frac{1}{2} s \cdot D^{(i-1)}$$

with D=symmetric numerical approximation of the first derivative (vector of 1 to 4), P=vector of parameters, i=iteration step i. s is the minimum positive length of step which would bring the parameters to the border of the feasible set. With 4 parameters initialized within the feasible set, (at most) 4 different positive s values exist that bring the parameter to 0 (with negative respective partial derivative) or 1 (positive respective partial derivative). The smallest one is selected in order to stay within the feasible set. Should the MSE grow at destination, only half of this way is chosen until it falls. This part of the procedure is terminated at convergence according to one of the usual stop rules.

However, it is possible that the solution ends up close to the border of the set and still is suboptimal. The opposite of the gradient strongly indicates out of the set and the whole step is strongly scaled to retain the solution inside. That is why, after the first time the convergence criterion has been fulfilled, the optimization runs with respect to single parameters (1 to 4 times) which facilitates to move along the border until the true minimum is found.

The only requirement for the initial values of parameters to guarantee finding the global minimum is that there is no local maximum between the initial values and the global minimum (saddle points are not an obstacle). However, among many time series analyzed, such a situation has not been encountered. One trivial, but (empirically) safe and efficient option is to initialize α, β and γ at 0.5 and φ at 1. Another possibility is to analyze all combinations of starting parameters at some accuracy (α, e.g. α=0, 1) and start at the one minimizing the MSE. However, this requires, for the most complex models, $$\left(\frac{1}{a}\right)^4$$

runs of the smoothing process, which makes this inadequately inefficient at high accuracy.

FIG. 16 shows a flowchart 400 of the different data processing steps for performing a method in accordance with one embodiment of the invention.

The input for the process in this embodiment is information on seasonality 402, which can either be determined by an automatic method, as described above, or be given as input by an expert user.

The first step 404 covers building possible combinations of trend types, considering non-trend, additive trend and multiplicative trend, and seasonality types, considering non-trend, additive trend and multiplicative seasonality.

Then, in the step 406, the most appropriate combination of trend and seasonality types for value prediction of a specific time series data is selected.

Next, in step 408, the time series data are differentiated 0, 1 and 2 times. Additionally, in step 410 the differentiated time series data are differentiated according to seasonal cycles 0, 1 and 2 times.

In step 412, the variances of the differentiated data are analyzed. In a further step, 414, the variances in a matrix form are arranged.

Further, in step 416, a model type based on the variance matrix is selected. In step 418, parameters for the model type are determined. In a further step 420, the parameters of the model type are optimized by fitting the time series data with a specific function and selecting parameters according to a gradient procedure.

Figure 17:
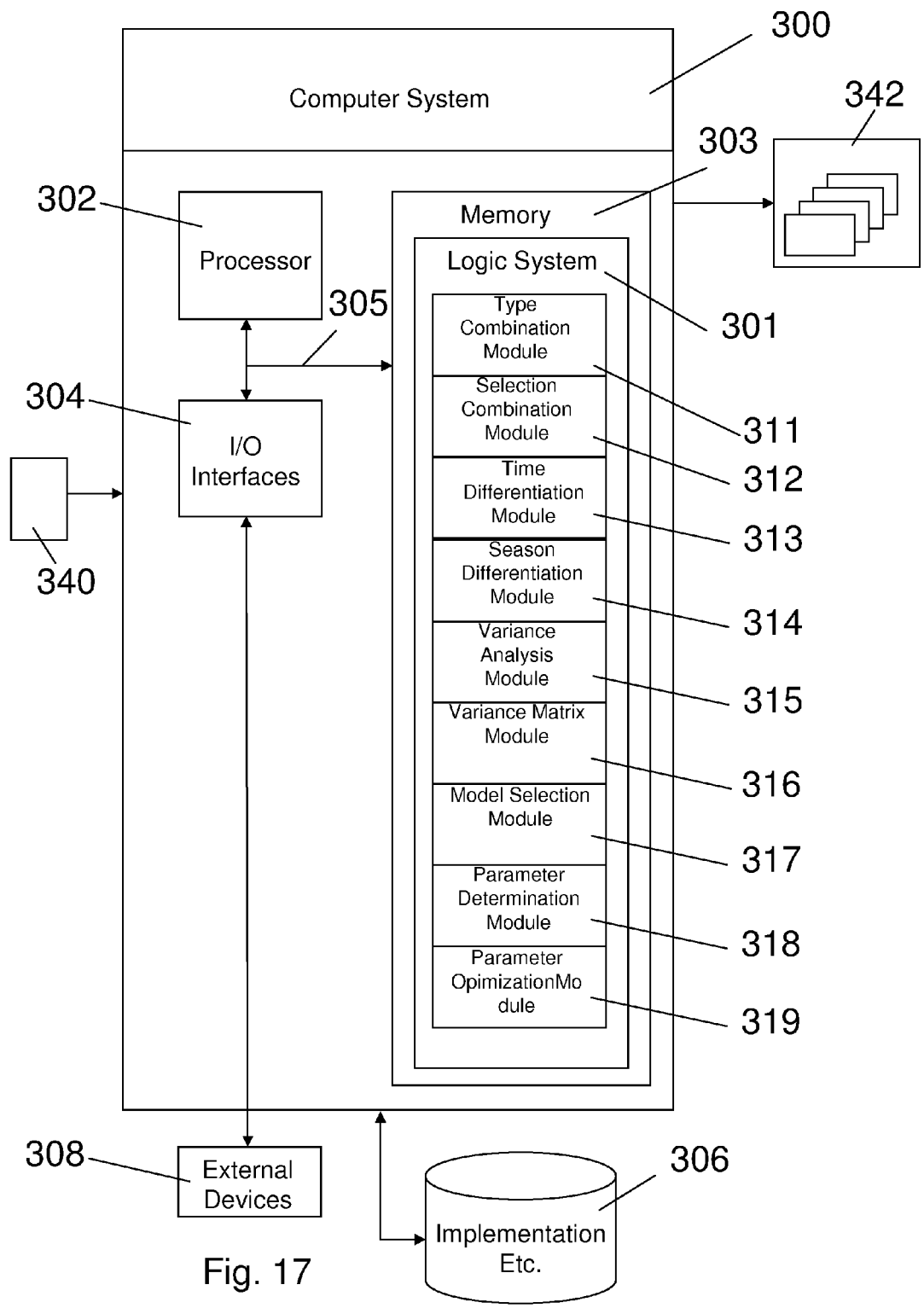
FIG. 17 a preferred data processing system for performing a method in accordance with one embodiment.

FIG. 17 shows a computer system implementation 300 of one embodiment of the invention is shown. Specifically, the invention can be implemented as a computer system 300 and/or program product 301 for conducting an analysis of a time series predicting future values of time series data characterized by exponentially smoothing the time series data. This allows a business user 340 to determine the model parameters for the exponential smoothing model without being an expert user. As depicted, computer system 300 generally comprises a processor subsystem 302, a memory 303, an input/output (I/O) interface 304, a bus subsystem 305, a database 306 as well as external devices 308.

Processor subsystem 302 encompasses the central processing unit (CPU) as well as any secondary processing devices, for example arithmetic processing unit, coupled to the CPU by the bus subsystem 305. Processor subsystem 302 may comprise a single processing unit, or be distributed across one or more processing units in one or more locations, e.g., on a client and server. Memory 303 may comprise any known type of data storage and/or transmission media, including magnetic media, optical media, random access memory (RAM), read-only memory (ROM), a data cache, a data object, etc. Moreover, memory 303 may reside at a single physical location, comprising one or more types of data storage, or be distributed across a plurality of physical systems in various forms.

I/O interface 304 may include any system for exchanging information from an external source. External devices 308 may include any known type of external device, including speakers, a CRT, LED screen, hand-held device, keyboard, mouse, voice recognition system, speech output system, printer, monitor, facsimile, pager, etc. Bus 305 provides a communication link between each of the components in the computer system 300 and likewise may comprise any known type of transmission link, including electrical, optical, wireless, etc. In addition, although not shown, additional components, such as cache memory, communication systems, system software, etc., may be incorporated into computer system 300.

Database 306 provides storage for information necessary to carry out the present invention. Such information could include time series data. Database 306 may include one or more storage devices, such as a magnetic disk drive or an optical disk drive. In another embodiment database 306 includes data distributed across, for example, a local area network (LAN), wide area network (WAN) or a storage area network (SAN) (not shown). Database 306 may also be configured in such a way that one of ordinary skill in the art may interpret it to include one or more storage devices. Moreover, it should be understood that database 306 could alternatively exist within computer system 300.

Stored in memory 303 is logic system 310. As depicted, logic system 310 preferably includes a type combination module 311 for building possible combinations of trend types, considering non-trend, additive trend and multiplicative trend, and seasonality types, considering non-trend, additive trend and multiplicative seasonality, a type selection module 312 in order to select the most appropriate combination of trend and seasonality types for value prediction of a specific time series data, a time differentiation module 313 for differentiating the time series data 0, 1 and 2 times, a seasonal differentiation module 314 for differentiating the differentiated time series data according to seasonal cycles 0, 1 and 2 times, a variance analysis module 315 for analyzing the variances of the differentiated data, a variance matrix module 316 for arranging the variances in a matrix form, a model selection module 317 for selecting a smoothing model based on the variance matrix, a parameter determination module 318 for determining the model parameters of the smoothing model, and a parameter optimization module 319 for optimizing the model parameters of the smoothing model. The modules shown herein carry out the functions described above, yielding an output for output module 342. The information concerning the seasonality can be stored in the database 306. Preferably, the seasonality can be determined automatically as depicted in FIG. 9, which can also be done by a or the same computer system 300 in a separate module in the logic system 301, which is not explicitly shown.

Each of the software modules 311 through 319 includes a set of instructions which are encoded in memory 303 as computer readable program code and executable by processor subsystem 302. Typically, the software modules 311 through 319 are stored in auxiliary memory of memory subsystem 303 prior to the execution thereof. External device 308, e.g. a CD-ROM or file transfer software, is used to copy the modules 311 through 319 into the auxiliary memory of memory subsystem 303.

The functionality provided by the software modules 311 through 319 may be encoded in the memory 303 and/or in computer usable medium as discrete programs, each containing computer readable program code. Alternatively, the functionality provided by the software modules 311 through 319 may be encoded in the memory 303 and/or in computer usable medium as separate subroutines of a single computer program containing several computer readable program subcodes. Furthermore, while any of the software modules 311 through 319 may be executed separately, typically the type combination module 311 will be initially executed by the processor 303, followed by the other modules 312 through 319.

Generally, the embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and so on.

Furthermore, embodiments of the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for time series analysis, comprising:
    receiving time series data in a computer system;
    differentiating, by a processor subsystem of the computer system, the time series data 0, 1 and 2 times to generate three transformed time series;
    differentiating by the processor subsystem each transformed time series according to seasonal cycles 0, 1 and 2 times;
    determining, by the processor subsystem, a variance for each seasonally transformed time series;
    selecting one or more subsets of variances among the determined variances;
    identifying a trend behavior among each selected subset of variances;
    determining seasonality of the time series data by
        providing a frequency spectrum of the time series data;
        processing the frequency spectrum to create a processed frequency spectrum by:
            filtering the frequency spectrum for reducing noise of the data,
            truncating the frequency spectrum at low frequencies, and
            weighting high frequency contributions over low frequency contributions of the frequency spectrum; and
        extracting a periodic cycle based on the processed frequency spectrum;
    building combinations of trend types and seasonality types, the trend types including non-trend, additive trend and multiplicative trend, and the seasonality types including non-trend seasonality, additive seasonality and multiplicative seasonality; and
    selecting, by the processor subsystem, an appropriate combination of trend type and seasonality type of the time series data among the built combinations, based on the identified trend behaviors in the subsets of variances.

2. The method of claim 1, wherein selecting an appropriate combination further comprises:
    selecting an appropriate combination from the following possible combinations of trend types and seasonality types: non-trend and non-trend seasonality, additive trend and non-trend seasonality, non-trend and additive seasonality, additive trend and additive seasonality, additive trend and multiplicative seasonality, multiplicative trend and non-trend seasonality, multiplicative trend and additive seasonality, multiplicative trend and multiplicative seasonality, non-trend and multiplicative seasonality for value prediction of a specific time series data.

3. The method of claim 1, further comprising:
arranging the variances in a matrix form.

4. The method of claim 3, further comprising:
selecting the appropriate combination based on the variance matrix.

5. The method of claim 4, further comprising:
choosing an additive seasonality when non-trend trend is present and an additive or multiplicative seasonality.

6. The method of claim 4, further comprising:
choosing an additive seasonality when additive trend is present and a weak multiplicative seasonality is present.

7. The method of claim 4, further comprising:
choosing a non-trend seasonality when multiplicative trend is present and strong.

8. The method of claim 4, further comprising:
choosing additive seasonality if amplitude of multiplicative seasonality over multiplicative trend is weakly growing or falling.

9. The method of claim 4, further comprising:
determining parameters for the appropriate combination of trend types and seasonality types: non-trend and non-trend seasonality, additive trend and non-trend seasonality, non-trend and additive seasonality, additive trend and additive seasonality, additive trend and multiplicative seasonality, multiplicative trend and non-trend seasonality, multiplicative trend and additive seasonality, multiplicative trend and multiplicative seasonality, non-trend and multiplicative seasonality.

10. The method of claim 4, further comprising:
optimizing parameters for the possible combinations of trend types and seasonality types:
non-trend and non-trend seasonality, additive trend and non-trend seasonality, non-trend and additive seasonality, additive trend and additive seasonality, additive trend and multiplicative seasonality, multiplicative trend and non-trend seasonality, multiplicative trend and additive seasonality, multiplicative trend and multiplicative seasonality, non-trend and multiplicative seasonality.

11. The method of claim 10, further comprising:
fitting the time series data with a specific function and selecting parameters with a gradient procedure.

12. A computer program product for performing time series analysis, comprising a non-transitory computer usable tangible storage medium having computer usable program code embodied therein, the computer usable program code comprising:
computer usable program code configured to receive time series data;
computer usable program code configured to differentiate the time series data 0, 1 and 2 times to generate three transformed time series;
computer usable program code configured to determine, a variance for each seasonally transformed time series;
computer usable program code configured to select one or more subsets of variances among the determined variances;
computer usable program code configured to identify a trend behavior among each selected subset of variances;
computer usable program code configured to determine seasonality of the time series data by
providing a frequency spectrum of the time series data;
processing the frequency spectrum to create a processed frequency spectrum by:
filtering the frequency spectrum for reducing noise of the data,
truncating the frequency spectrum at low frequencies, and
weighting high frequency contributions over low frequency contributions of the frequency spectrum; and
extracting a periodic cycle based on the processed frequency spectrum;
computer usable program code configured to build combinations of trend types and seasonality types, the trend types including non-trend, additive trend and multiplicative trend, and the seasonality types including non-trend seasonality, additive seasonality and multiplicative seasonality;
and
computer usable program code configured to select an appropriate combination of trend type and seasonality type of the time series data among the built combinations, based on the identified trends behaviors in the subsets of variances.

13. The computer program product of claim 12, further including at least one of the following:
computer usable program code configured to select the most appropriate combination of trend and seasonality types for value prediction of a specific time series data;
computer usable program code configured to arrange the variances in a matrix form;
computer usable program code configured to select a model type based on the variance matrix;
computer usable program code configured to determine parameters for the model type;
computer usable program code configured to optimize the parameters for the model type.

14. A system for time series analysis, the system comprising:
a processor, the processor executing a computer program comprising instructions for:
receiving time series data;
differentiating the time series data 0, 1 and 2 times to generate three transformed time series;
differentiating by the processor subsystem each transformed time series according to seasonal cycles 0, 1 and 2 times;
determining a variance for each seasonally transformed time series;
selecting one or more subsets of variances among the determined variances;
identifying a trend behavior among each selected subset of variances;
determining seasonality of the time series data by
providing a frequency spectrum of the time series data;
processing the frequency spectrum to create a processed frequency spectrum by:
filtering the frequency spectrum for reducing noise of the data,
truncating the frequency spectrum at low frequencies, and
weighting high frequency contributions over low frequency contributions of the frequency spectrum; and
extracting a periodic cycle based on the processed frequency spectrum;
building combinations of trend types and seasonality types, the trend types including non-trend, additive trend and multiplicative trend, and the seasonality types including non-trend seasonality, additive seasonality and multiplicative seasonality; and selecting an appropriate combination of trend type and seasonality type of the time series data among the built combinations, based on the identified trend behaviors in the subsets of variances.

* * * * *